J. I. HOKE.
TWO WHEEL TRACTOR.
APPLICATION FILED MAR. 24, 1910.
1,073,490.
Patented Sept. 16, 1913.
2 SHEETS—SHEET 1.
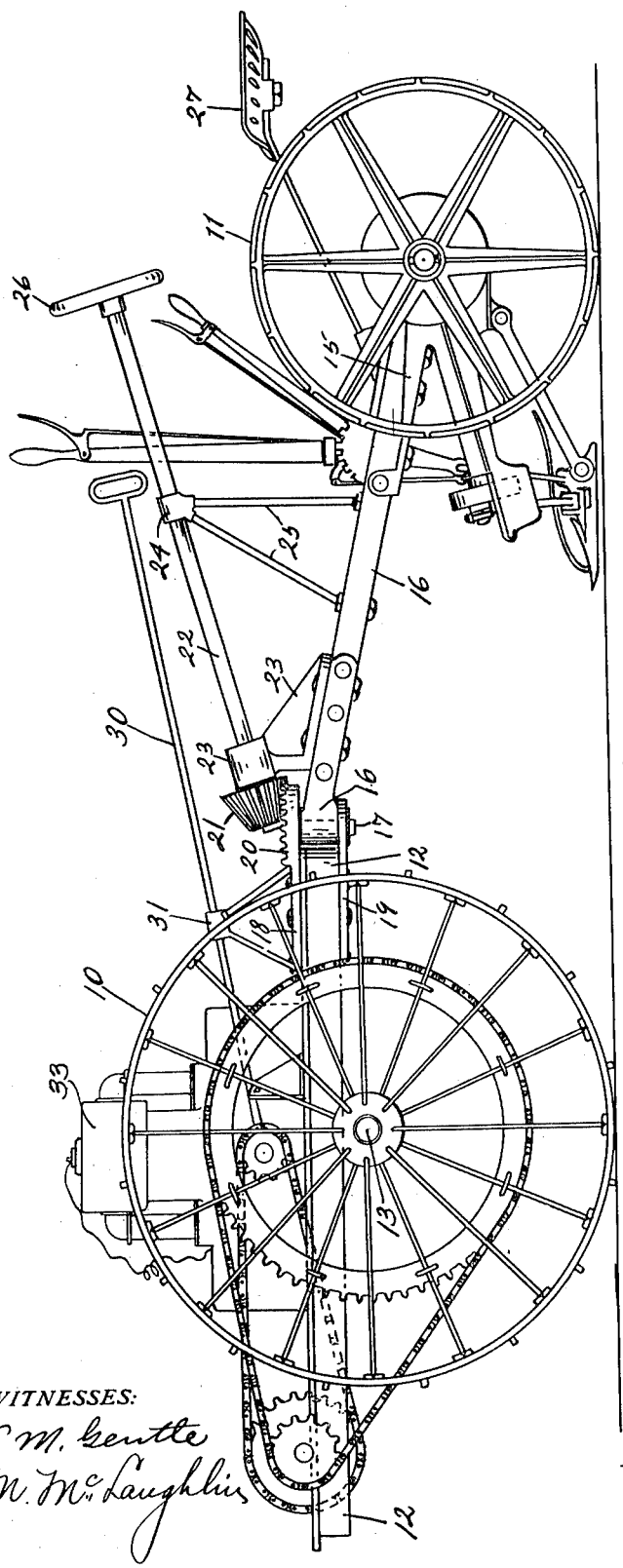
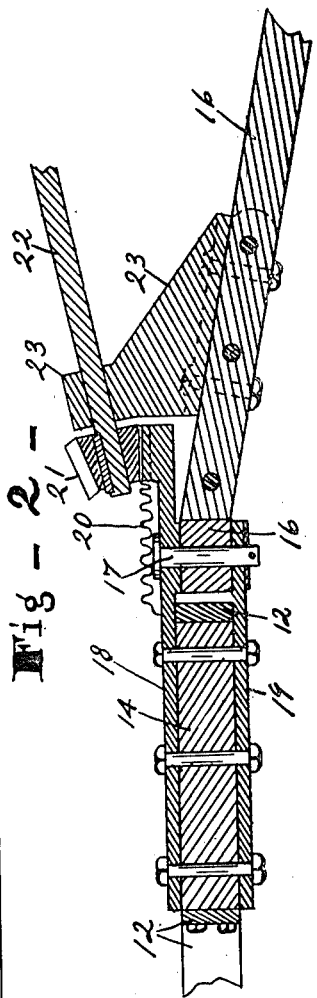
WITNESSES:
W. M. Gentle
O. M. McLaughlin
INVENTOR.
John I. Hoke.
BY
V. H. Lockwood
ATTORNEY.

J. I. HOKE.
TWO WHEEL TRACTOR.
APPLICATION FILED MAR. 24, 1910.
1,073,490.
Patented Sept. 16, 1913.
2 SHEETS—SHEET 2.
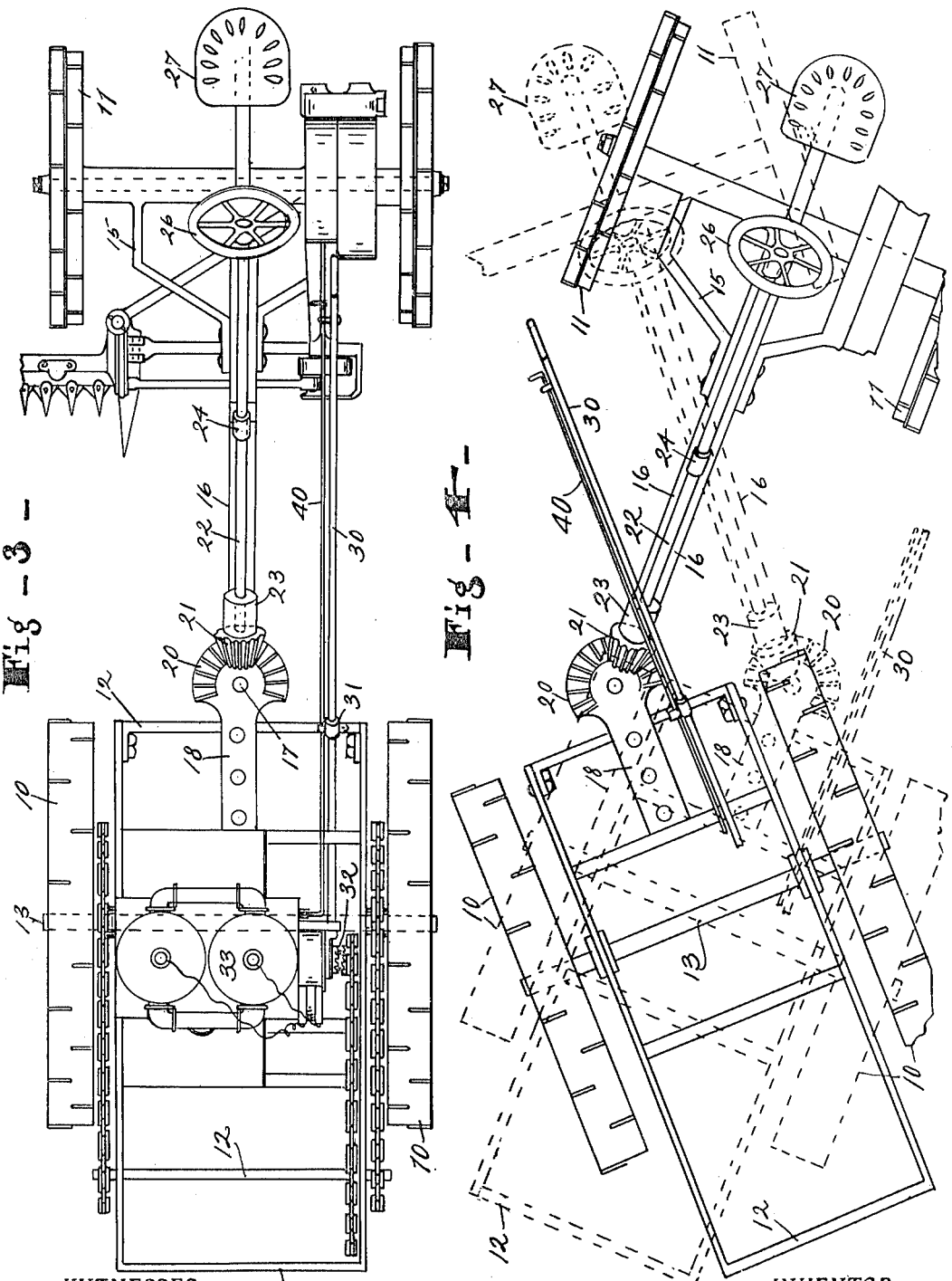
WITNESSES:
W. M. Gentle
O. M. McLaughlin
INVENTOR.
John I. Hoke.
BY
V. H. Lockwood
ATTORNEY.

UNITED STATES PATENT OFFICE.

JOHN I. HOKE, OF FRANKFORT, INDIANA.

TWO-WHEEL TRACTOR.

1,073,490.  Specification of Letters Patent.  Patented Sept. 16, 1913.

Application filed March 24, 1910. Serial No. 551,365.

*To all whom it may concern:*

Be it known that I, JOHN I. HOKE, of Frankfort, county of Clinton, and State of Indiana, have invented a certain new and useful Two-Wheel Tractor; and I do hereby declare that the following is a full, clear, and exact description thereof, reference being had to the accompanying drawings.

The object of this invention is to provide an improved mechanical traction means for pulling agricultural implements and also vehicles of various kinds.

The chief feature of the invention consists in providing a two-wheel tractor.

Four-wheel traction engines have been used for drawing vehicles and farm implements, but they require a man to operate the traction device in addition to the man who operates the vehicle or agricultural machine and they also are so difficult to turn that their use is attended with considerable expense and many disadvantages. The result is that the farmers say they must hire their neighbor's farm to turn around in, and the traction devices are so very large that they are extremely expensive, and this, in addition to the expense of an engineer, has greatly limited the adoption of traction engines on the farm.

A two-wheel tractor is not much heavier than a single horse and can turn in space no larger than an ordinary room and can be operated by the man who operates the mowing machine or other device pulled by the tractor. Hence this invention not only is very economical comparatively, but it can be used in plowing ground that is too wet or swampy for the four-wheel traction engine to run it at all, and it can be used for plowing or operating machines up close to the fence or hedgerow, as it can be turned within a small area.

In carrying out said invention the tractor frame has a rearwardly extending coupling member that is pivotally coupled with a forwardly extending coupling member from the frame of the vehicle drawn by the tractor, so that the frames of the tractor and vehicle will be held in horizontal positions but will be capable of lateral angular movement, and a steering wheel is provided for varying the angular relationship laterally of the two coupling members so as to steer the combined mechanism. Hence, from the seat of the vehicle drawn the tractor is steered and also its operation is controlled by one man.

The nature of the invention will be understood from the accompanying drawings and the following description and claims.

In the drawings Figure 1 is a side elevation of the two-wheel tractor coupled with a mowing machine. Fig. 2 is a central vertical section through the adjacent ends of the coupling members. Fig. 3 is a plan view of what is shown in Fig. 1, while the device is running straight. Fig. 4 is a plan view of what appears in Fig. 3 while turning in one direction, parts being broken away, and the position of the elements of the mechanism while turning in the opposite direction are indicated by dotted lines.

There is shown in the drawings a two-wheel tractor 10 and a mowing machine 11. These may be of any type of construction or arrangement and are separate devices. The tractor has a frame 12 mounted on the axle 13 so that any lateral movement of the frame will cause a corresponding movement of the wheels and axle. Said frame has a rearwardly extending coupling member 14 rigidly connected therewith. The mowing machine or vehicle likewise has a frame 15 which is mounted in connection with the axle thereof so that any lateral movement of the frame will cause a similar movement of the axle and wheels, and from said frame there is a forwardly extending coupling member 16, like a short tongue. The two coupling members 14 and 16 are coupled together by the vertical coupling pin 17 so that they are capable of lateral movement at the coupling to vary the angular relationship of the two coupling members and thereby of the tractor and mowing machine. The coupling bar 14 on the tractor has top and bottom plates 18 and 19 between which the forward end of the coupling member 16 projects and this sort of coupling maintains the horizontal position of the frames of the tractor and mowing machine. When the tractor is uncoupled one end of it would have to be supported by a stick or other means.

The steering of the compound organization is effected by changing the angular relationship laterally of the two coupling members, and thereby of the tractor and mowing machine. This is done by providing a segmental gear or rack 20 on the horizontal plate 18 with which a pinion 21 on the steering shaft 22 meshes. The steering shaft 22 is mounted at its forward end in a bearing frame 23 secured on the coupling member 16 of the mowing machine. The steering shaft 22 has also a bearing 24 about midway thereof that is supported on rods 25 mounted on said coupling member 16. The shaft extends rearwardly on the mowing machine and has a steering wheel 26 on its rear end in position to be operated by a person in the seat 27 of the mowing machine.

The parts are in the position shown in Fig. 3 when they are running straight. If it be desired to turn to the left, the steering wheel is turned to the right and that throws the parts in the position shown in Fig. 4, that is, it changes the angular relationship laterally of the coupling members and also of the tractor and mowing machine and the forward movement of the mowing machine will cause the whole device to turn around. The angle can be diminished much more than that shown in Fig. 4; in fact, there is nothing to limit the angle excepting the tractor wheel coming around against the coupling member 16 of the mowing machine, which would bring the two parts of the device at a right angle to each other substantially. If it be desired to turn to the right, the parts are moved to the position indicated by the dotted lines in Fig. 4. With this explanation it is obvious to any one that the device is very easily steered by turning in either direction and for making sharp turns, if desired.

The details of the mowing machine and the tractor need not be described as there is nothing particular in them excepting that the operation of the tractor is controlled by the long clutch rod 30 and a throttle rod 40 which run back into close proximity with the seat on the mowing machine, so that one person on the mowing machine can steer the entire device and also control the operation of the tractor from his seat. The rod 30 is mounted between its ends in the bearing 31 carried on the tractor frame and the inner end of the rod runs to the clutch 32, whereby the engine on the tractor is thrown into operative engagement with the means for transmitting power therefrom to the traction wheels of the tractor. Rod 40 is carried by rod 30. Any sort of construction as to these parts may be employed.

It may be added that it is immaterial, so far as this invention is concerned, whether all of the agricultural implement or vehicle be mounted behind the tractor, that is, independently of the tractor. The chief point is that some portion of the vehicle or agricultural implement is required to be coupled up with the tractor in the manner herein set out for the purpose of steering the tractor. Thus plows may be hitched to the tractor frame and run under the rear part thereof with the sulky or vehicle drawn behind like the mowing machine here shown.

In that event, the power of the tractor will be exerted directly on the plow beam while the sulky will steer the tractor, and this latter construction is the form in which this invention so far has been employed by me.

The guide vehicle may consist of a one-wheel or a two-wheel vehicle, a sled, or any other implement or vehicle which would couple up with the tractor and is provided with the steering means substantially as herein set forth to cause the entire device to be steered. Also, I do not wish to be limited to a tractor or vehicle with axles. If the frame is mounted in spindles carried by the wheels, the operation will be just the same as if axles were employed. The device can be moved backwardly and turned as well as turned forwardly.

I claim as my invention:

1. The combination of a device capable of being moved on the ground and turned as a unit, and having a coupling member extending forwardly therefrom, a two-wheel tractor with a coupling member extending rearwardly and having a plate at its rear end provided with a horizontally disposed segmental rack, a pin for coupling said coupling members together at a point concentric with said segmental rack, and steering means mounted on the coupling member of said device and having a bevel pinion which engages said segmental rack.

2. The combination of a device capable of being moved on the ground and turned as a unit and having a coupling member extending forwardly therefrom, a two-wheel tractor with a coupling member extending rearwardly therefrom and having a plate at its rear end provided with a horizontally disposed segmental rack, one of said coupling members being divided into upper and lower parts between which the end of the other coupling member extends and fits, whereby the frames of the two devices will be maintained in a horizontal position, a pin for coupling said coupling members together at a point concentric with said segmental rack, and a steering means mounted on the coupling member of said first-mentioned device and having a beveled pinion which engages said segmental rack.

3. The combination with a wheeled machine capable of being turned as a unit and provided with a forwardly extending coupling member, of a two-wheel tractor arranged in advance of said machine and provided with a coupling member extending rearwardly to a point where its rear end is beyond the wheels of the tractor, said coupling members being interlocked, a pin for holding said members in interlocked relation and capable of swinging movement in relation to each other, whereby the frames of the wheeled machine and the tractor are maintained in a horizontal position but capable of angular adjustment, a plate mounted upon the rear end of the coupling member of the tractor and provided with a horizontally-disposed segmental rack, said rack being concentric with said coupling pin, a steering rod journaled upon the coupling member of the wheeled machine, and a pinion carried by said rod and meshing with said segmental rack.

In witness whereof, I have hereunto affixed my signature in the presence of the witnesses herein named.

JOHN I. HOKE.

Witnesses:
G. H. BOINK,
O. M. McLAUGHLIN.